(12) United States Patent
Wang

(10) Patent No.: US 11,073,879 B2
(45) Date of Patent: Jul. 27, 2021

(54) ELECTRONIC DEVICE

(71) Applicant: Lenovo (Beijing) Co., Ltd., Beijing (CN)

(72) Inventor: Jinfeng Wang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/835,162

(22) Filed: Mar. 30, 2020

(65) Prior Publication Data

US 2020/0310503 A1 Oct. 1, 2020

(30) Foreign Application Priority Data

Mar. 31, 2019 (CN) .......................... 201910254539.2
Mar. 31, 2019 (CN) .......................... 201910254543.9

(51) Int. Cl.
*G06F 1/20* (2006.01)
*G06F 1/16* (2006.01)

(52) U.S. Cl.
CPC ............ *G06F 1/203* (2013.01); *G06F 1/1616* (2013.01); *G06F 1/1637* (2013.01); *G06F 1/1681* (2013.01); *G06F 1/206* (2013.01)

(58) Field of Classification Search
CPC ........ G06F 1/203; G06F 1/1616; G06F 1/206; G06F 1/1681; G06F 1/1637; G06F 1/166; G06F 2200/202
See application file for complete search history.

(56) References Cited

U.S. PATENT DOCUMENTS

| 5,131,779 | A | * | 7/1992 | Sen | .......................... | F16M 11/10 |
| | | | | | | 16/342 |
| 5,552,960 | A | * | 9/1996 | Nelson | ..................... | G06F 1/203 |
| | | | | | | 165/104.33 |
| 5,995,373 | A | * | 11/1999 | Nagai | ................... | G06F 1/1616 |
| | | | | | | 16/223 |
| 6,459,573 | B1 | * | 10/2002 | DiStefano | ............... | G06F 1/203 |
| | | | | | | 361/679.46 |
| 2006/0094347 | A1 | * | 5/2006 | Tracy | ...................... | G06F 1/206 |
| | | | | | | 454/184 |
| 2007/0146978 | A1 | * | 6/2007 | Nakatani | ............... | G06F 1/1683 |
| | | | | | | 361/679.27 |
| 2009/0147469 | A1 | * | 6/2009 | Chen | ....................... | G06F 1/183 |
| | | | | | | 361/679.55 |
| 2010/0165567 | A1 | * | 7/2010 | Shih | ...................... | G06F 1/1667 |
| | | | | | | 361/679.48 |
| 2011/0075352 | A1 | | 3/2011 | Tye et al. | | |

(Continued)

FOREIGN PATENT DOCUMENTS

CN 2775995 Y 4/2006
CN 201464981 U 5/2010
(Continued)

*Primary Examiner* — Abhishek M Rathod
(74) *Attorney, Agent, or Firm* — Anova Law Group, PLLC

(57) ABSTRACT

The present disclosure provides an electronic device. The electronic device includes a first body including a display module for displaying content; and a second body coupled with the first body and including a first processor for generating the displayed content. The second body includes a first opening as a part of a first airflow path for dissipating heat generated by the first processor; and the first opening faces toward the first body.

15 Claims, 6 Drawing Sheets

(56) References Cited

U.S. PATENT DOCUMENTS

| | | | |
|---|---|---|---|
| 2013/0077241 A1* | 3/2013 | Senatori | G06F 1/203 361/694 |
| 2014/0092542 A1* | 4/2014 | Nishi | G06F 1/203 361/679.06 |
| 2014/0092544 A1* | 4/2014 | Nishi | G06F 1/203 361/679.09 |
| 2019/0250674 A1* | 8/2019 | Lin | F16M 13/005 |
| 2020/0142456 A1* | 5/2020 | Hsu | G06F 1/1681 |

FOREIGN PATENT DOCUMENTS

| | | |
|---|---|---|
| CN | 103809715 A | 5/2014 |
| CN | 203706065 U | 7/2014 |
| CN | 109373159 A | 2/2019 |

\* cited by examiner

ELECTRONIC DEVICE

CROSS-REFERENCES TO RELATED APPLICATIONS

This application claims the priority of Chinese Patent Application No. 201910254543.9, filed on Mar. 31, 2019 and Chinese Patent Application No. 201910254539.2, filed on Mar. 31, 2019, the entire contents of which are incorporated herein by reference.

FIELD OF THE DISCLOSURE

The present disclosure generally relates to the field of electronic device technology and, more particularly, relates to an electronic device.

BACKGROUND

A notebook computer often includes a plurality of heat dissipation openings arranged in a thickness direction on a back side, a left-hand side, or a right-hand side. As gamer's requirement for heat dissipation efficiency of the notebook computer grows more and more stringent, manufacturers respond by increasing an area of the plurality of heat dissipation openings on the existing notebook computers. However, increasing the area of the plurality of heat dissipation openings also increases thickness and weight of the notebook computers.

BRIEF SUMMARY OF THE DISCLOSURE

One aspect of the present disclosure provides an electronic device. The present disclosure provides an electronic device. The electronic device includes a first body including a display module for displaying content; and a second body coupled with the first body and including a first processor for generating the displayed content. The second body includes a first opening as a part of a first airflow path for dissipating heat generated by the first processor; and the first opening faces toward the first body.

Other aspects of the present disclosure can be understood by those skilled in the art in light of the description, the claims, and the drawings of the present disclosure.

BRIEF DESCRIPTION OF THE DRAWINGS

To more clearly illustrate the technical solution in the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

NUMERALS IN FIGS. 1-8

Figure 1:
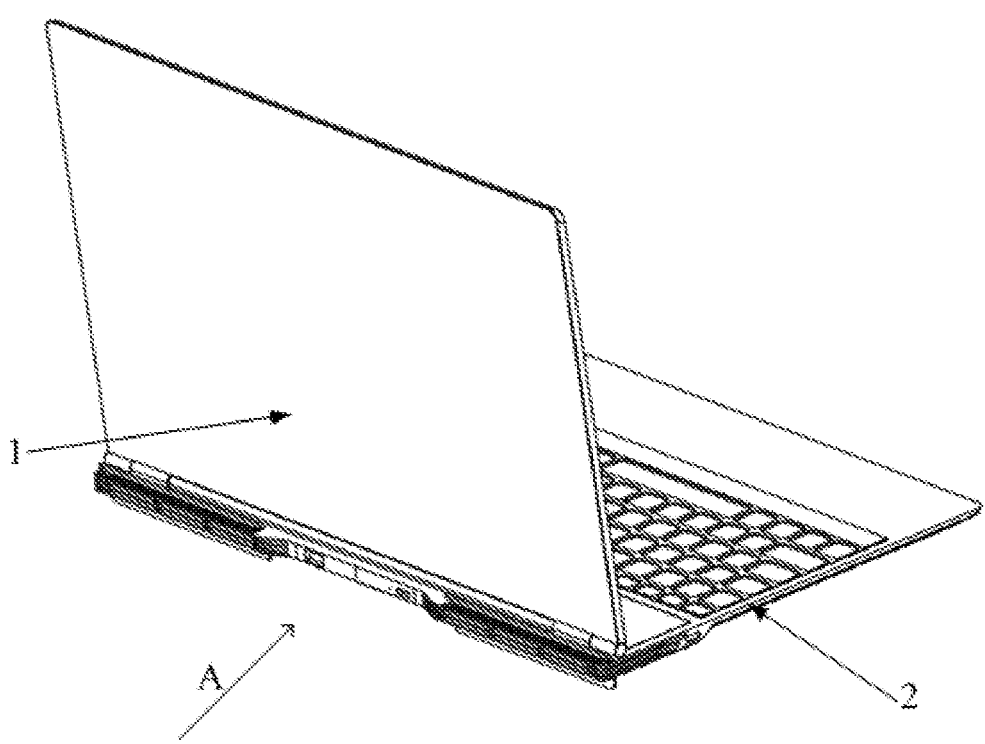
FIG. 1 illustrates a three-dimensional (3D) structural diagram of an example of an electronic device when both a first opening and a second opening are opened according to some embodiments of the present disclosure.
Figure 2:
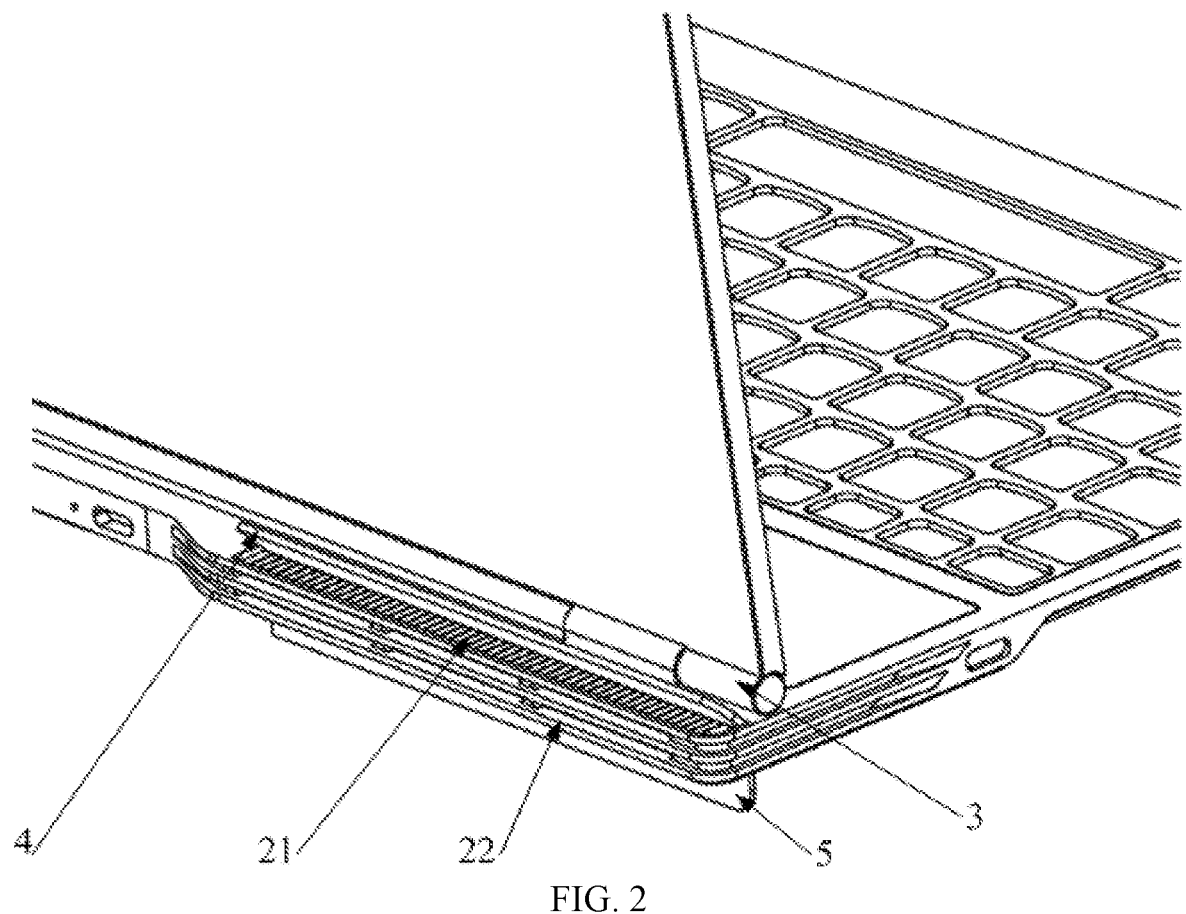
FIG. 2 illustrates a partially enlarged view of FIG. 1.
Figure 3:
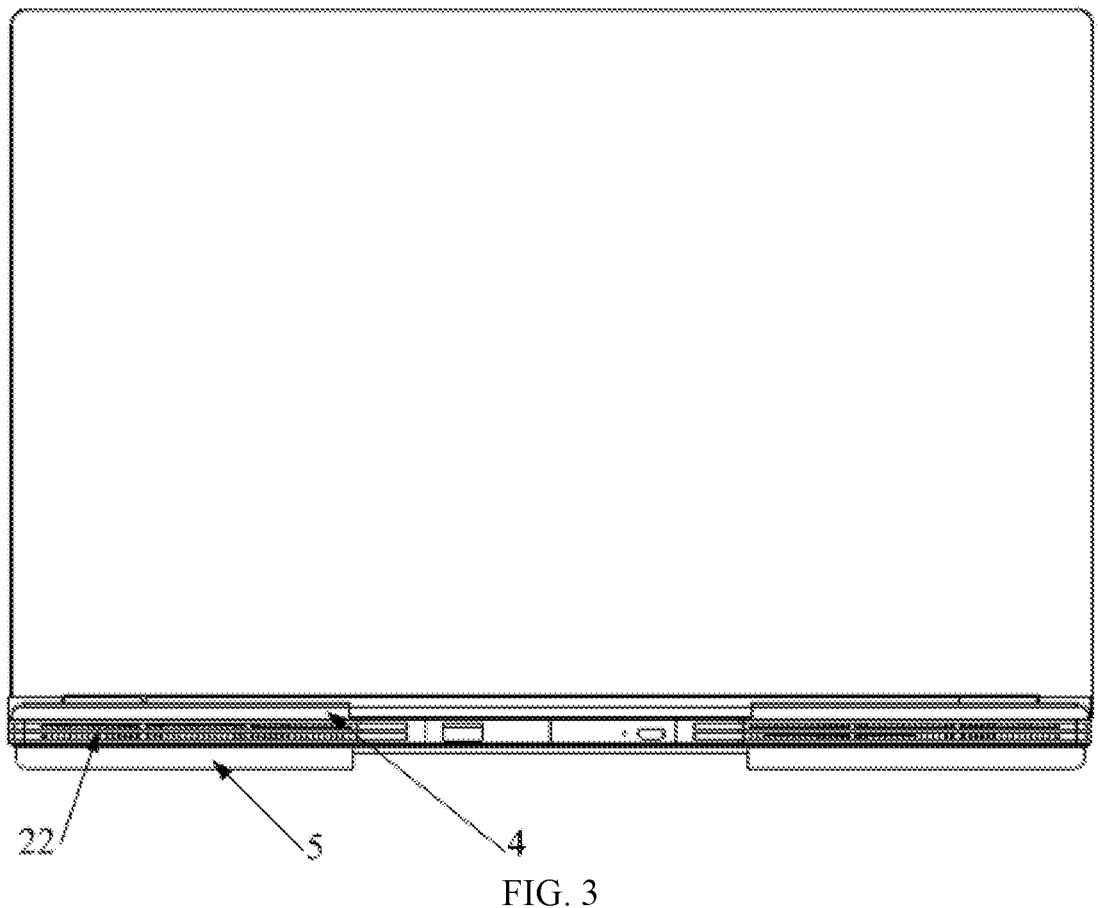
FIG. 3 illustrates a schematic structural view along a direction A in FIG. 1.
Figure 4:
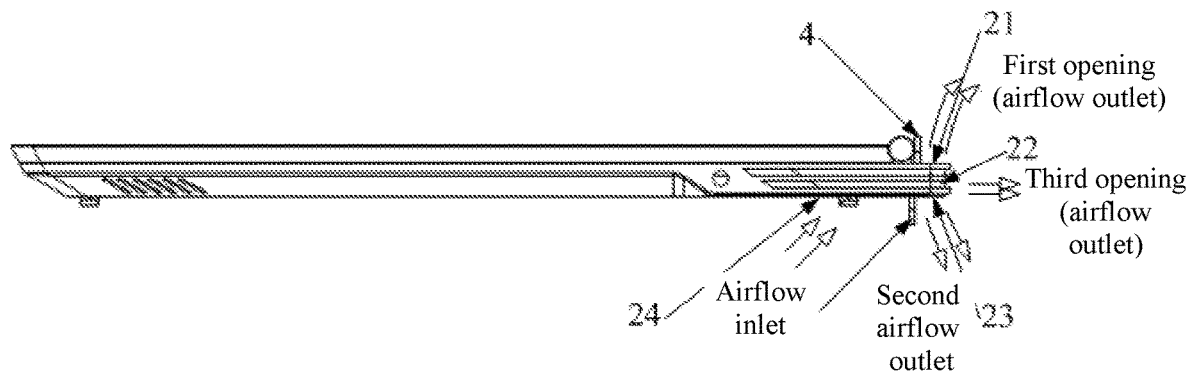
FIG. 4 illustrates a schematic side view of the electric device in FIG. 1.

1: first body
2: second body
21: first opening
22: third opening
23: second airflow outlet
24: airflow inlet
3: rotating shaft mechanism
3a: first rotating shaft
3b: second rotating shaft
4: first switching module
40: enclosure
41: heat-dissipating holes
5: second switching module
6: function component
7: second rotating bracket
8: first rotating bracket
9: heat sink
10: heat pipe

DETAILED DESCRIPTION

To describe the technical solutions more clearly and more completely, the embodiments of the present disclosure will be described with reference to the drawings. The described embodiments are only some but not all of the embodiments of the present disclosure. Based on the embodiments of the present disclosure, other embodiments obtained by a person of ordinary skill in the art without creative efforts shall fall within the protection scope of the present disclosure.

The present disclosure provides an electronic device. Referring to FIGS. 1-6, the electronic device includes 1 first body 1 and a second body 2. The first body 1 includes a display module for outputting display contents. The second body 2 is coupled with the first body 1. The second body 2 includes a first processor for at least generating the display contents. The second body 2 includes a first opening 21. The first opening 21 can be a part of a first airflow path. The first airflow path can at least carry a first airflow for heat dissipation of the first processor. The first opening 21 faces in a direction from the second body 2 toward the first body 1.

The first opening 21 facing in the direction from the second body 2 toward the first body 1 refers to the first opening 21 facing in a thickness direction of the second body 2.

When the electronic device is in use, a user faces toward the display module of the first body 1. The first opening 21 is disposed on the top of the second body 2 and faces upward. That is, the first opening 21 is not disposed on a surface of the second body 2 in the thickness direction. Increasing an area of heat dissipation of the first opening 21 can increase the heat dissipation efficiency and at the same time changing the area of heat dissipation does not affect the thickness of the second body 2, thereby avoiding increasing the thickness and weight of the electronic device.

In some embodiments, the first body 1 is adjacent to a projection of an end of the second body 2 on the second body 2. The second body 2 can be divided into a first part and a second part. The first part faces toward the display surface of the display module of the first body 1. The first opening 21 is disposed on the second part.

When the electronic device is a notebook computer, the first body 1 is a display screen. The second body 2 is a motherboard base. The first body 1 is adjacent to the projection of the end of the second body 2 on the second body 2. That is, the projection refers to the bottom of a rotating shaft mechanism connecting between the display screen and the motherboard base. For example, when the rotating shaft mechanism includes a left-side section and a right-side section, a line connecting between the left-side section and the right-side section and an extension of the line separates the second body 2 into the first part and the second part. When the rotating shaft mechanism includes a long single-piece shaft, the extension line of the long single-piece shaft separates the second body 2 into the first part and the second part.

When the electronic device is an all-in-one computer, the first body 1 is the display screen. The second body 2 is the motherboard base. The motherboard base supports the display screen through a bracket. The first body 1 is adjacent to the projection of the end of the second body 2 on the second body 2. That is, the bottom of the display screen is projected on the motherboard base. The projection separates the second body 2 into the first part and the second part.

The first part of the second body 2 faces toward the display surface of the display module of the first body 1. That is, the first part is disposed on a display side of the display module, and the second part is disposed on a non-display side of the display module. For the notebook computer, the first part faces toward the display side of the display module. That is, when the display screen is opened less than 90 degrees, the display screen and the first part face toward each other. When the display screen is opened more than 90 degrees, the display screen and the first part face toward a roughly same direction. For the all-in-one computer, the first part faces toward the display side of the display module. That is, the display screen and the first part face toward each other.

In some embodiments, the first opening 21 is disposed on the non-display side of the display module or the rear side of the display module. Thus, the heat dissipated from the first opening 21 does not affect the operation of the first part, thereby making the operation comfortable.

For example, the first body 1 and the second body 2 are both plate-shaped. After the first body 1 closes on the second body 2, a front-to-back length of the first body 1 is shorter than a front-to-back length of the second body 2. A front end of the first body 1 is aligned with a front end of the second body 2. A rear end of the second body 2 protrudes from a rear end of the first body 1. In one example, the rear end of the second body 2 can be a flat surface, that is, the left-side width and the right-side width of the second part are approximately equal. In another example, the rear end of the second body 2 can be an uneven surface having a protrusion on at least one side or in the middle.

Referring to FIGS. 1-4, the rear end of the second body 2 is an uneven surface having the protrusion on both sides. Interface ports of the second body 2 are disposed in a recessed section of the rear end. The first opening 21 is disposed on the top surface of the protrusions. The heat dissipation efficiency increases as the size of the protrusions increases to certain extent. The rear end of the second body 2 may include one or more protrusions. The one or more protrusions may be disposed in the middle of the first part or on both sides of the first part. In some embodiments, the first opening 21 may be disposed on the second part.

In one example, the electronic device is a notebook computer. The first body 1 is the display screen. The second body 2 is the motherboard base. The display screen is disposed on the top surface of the motherboard base. The first opening 21 is disposed on the top surface of the motherboard base behind the display screen.

In another example, the electronic device is the all-in-one computer. The first body 1 is the display screen. The second body 2 is the motherboard base. The display screen is disposed above the motherboard base and is supported by a bracket. The first opening 21 is disposed on the top surface of the motherboard base behind the display screen.

In some embodiments, the second body 2 further includes at least a second opening. The second opening can be a part of a second airflow path. The second airflow path can at least carry a second airflow for the heat dissipation of the first processor. The second opening and the first opening 21 face in different directions. For example, the first opening 21 faces upward and the second opening faces in at least one of a leftward direction, a rightward direction, or a downward direction.

In one example, both the first opening 21 and the second opening can be outlets and hot air is blown outward through two airflow paths. As such, the heat dissipation efficiency is further improved. In another example, one of the first opening 21 and the second opening can be an inlet and the other can be an outlet to form a complete airflow path. Alternatively, the second body 2 may not include the second opening and may dissipate the heat only through the first opening 21.

In some embodiments, the electronic device further includes a first switching module 4 having a first position and a second position. The first switching module 4 at the first position blocks the first opening 21. The first switching module 4 at the second position does not block the first opening 21. The first switching module 4 can be an upper airflow deflector. When not in use, the first opening 21 is concealed by the upper airflow deflector, thereby improving the appearance. When the first opening 21 is in use, the upper airflow deflector deflects the airflow exiting the first opening 21 away from the first body 1. That is, the hot air is blown in a rear-upward direction to avoid the first body 1. The first switching module 4 can also be a grille. In some embodiments, the electronic device may not include the first switching module 4 leaving the first opening 21 unprotected.

For the convenience of operation, the first switching module 4 rotates between the first position and the second position. The first switching module 4 can be a snap-on coupling mechanism or a screw-on coupling mechanism, detachably disposed on the second body 2. When detached, the first switching module 4 unblocks the first opening 21. When attached, the first switching module 4 blocks the first opening 21. As another example, the first switching module 4 may be slid between the first position and the second position, which is not limited by the present disclosure.

In some embodiments, the first body 1 and the second body 2 are rotationally connected through a rotating shaft mechanism 3. The rotating shaft mechanism 3 is connected to a driving mechanism. When the first body 1 rotates relative to the second body 2, the rotating shaft mechanism 3 drives the first switching module 4 to rotate through the driving mechanism.

In some embodiments, when the first body 1 rotates relative to the second body 2, the driving mechanism drives the first switching module 4 to rotate synchronously to open or close the first opening 21. That is, a separate driving mechanism to drive the first switching module 4 is not needed, thereby simplifying the overall structure.

In some embodiments, the electronic device further includes a driving assembly for driving the first switching module 4, a sensor for measuring a temperature corresponding to the second body 2, a controller coupled with the sensor. After the temperature corresponding to the second body 2 reaches a pre-set temperature, the controller controls the driving assembly to drive the first switching module 4 to rotate to the second position. The driving assembly can be an electric motor. When in use, the driving assembly uses the sensor to measure the temperature corresponding to the second body 2 and passes a temperature signal to the controller. After the temperature corresponding to the second body 2 reaches the pre-set temperature, the controller controls the electric motor to drive the first switching module 4 to the second position to open the first opening 21 to dissipate heat.

In the embodiments of the present disclosure, the first switching module 4 is automatically switched between the two positions such that the human intervention is eliminated. In some other embodiments, the first switching module 4 may also be rotated manually.

To further optimize the above-described embodiments, the first switching module 4 can include a function component 6 coupled with a second processor for obtaining data or outputting data. The function component 6 can be a camera or a microphone for obtaining the data and can also be a speaker or a display screen for outputting the data.

In this way, additional functions can be added to or implemented by the electronic device. For a notebook computer, the first switching module 4 is configured to accommodate a camera to avoid occupying a screen area by the camera, thereby achieving a full-screen operation experience. When not in use, the camera can be concealed together with the first switching module 4 behind the display screen, such that a camera assembly is seamlessly blended into the overall appearance of the electronic device. Further, concealing the camera assembly protects privacy, that is, the camera assembly cannot be remotely controlled to capture images. The first switching module 4 may include no function component 6, and may only block or unblock the first opening 21.

In some embodiments, the first body 1 and the second body 2 are at a first relative position, where the display surface of the display module does not face toward the second body 2. When the first switching module 4 rotates to the second position, the function component 6 obtains or outputs the data in a same direction as the display surface of the display module faces. The first relative position refers to that the display screen of the notebook computer opens more than 90 degrees and faces upward. At the same time, the first switching module 4 does not block the first opening 21. As such, the camera is driven to face toward a same direction as the display screen faces to facilitate the camera to obtain images.

In some embodiments, the first body 1 and the second body 2 are at a second relative position, where the display screen of the notebook computer opens less than 90 degrees. At the second relative position, the camera is not in use, and the function component 6 is not needed. The first switching module 4 is not required to rotate to the second position. Thus, the scenario that the function component 6 is disposed not at an operation position is less likely to occur, which further reduces movement frequency of the first switching module 4.

In some embodiments, when the first switching module 4 rotates to the second position, a distance between the function component 6 and the second body 2 is greater than a distance between the display module and the second body 2. In this way, when the first switching module 4 no longer blocks the first opening 21, the function component 6 remains at a position above the display module, the display module is not interfered, and the user experience is not compromised.

Figure 5:
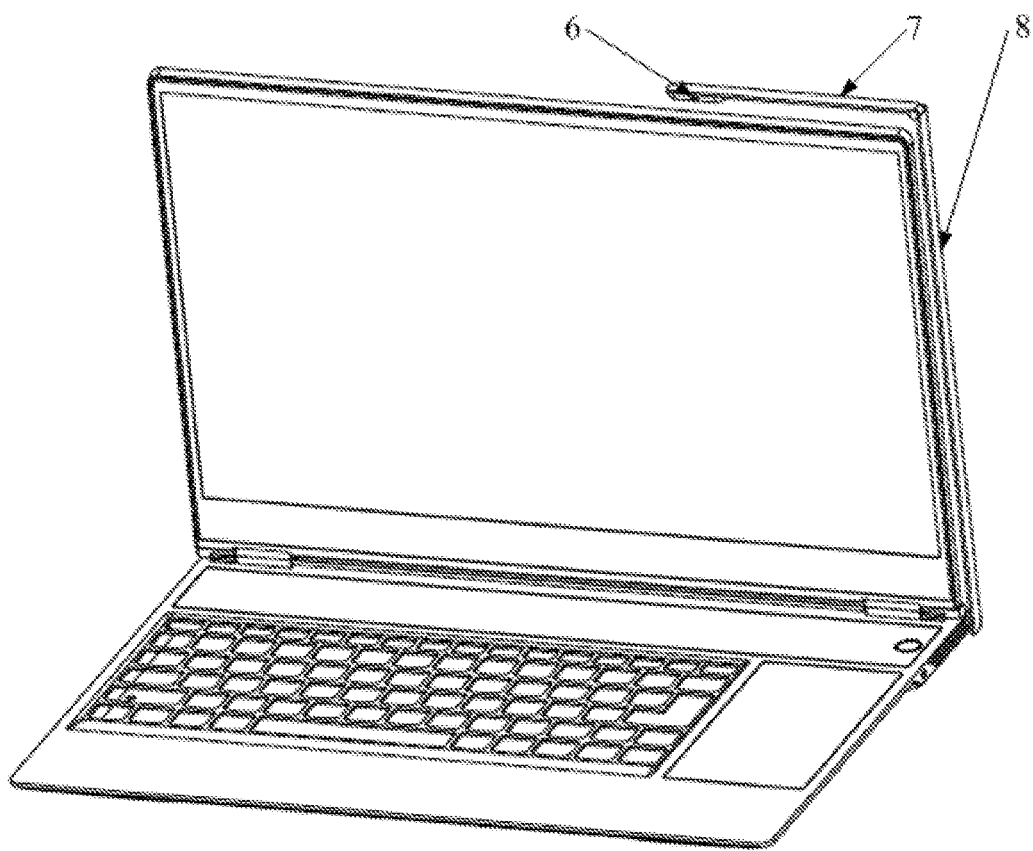
FIG. 5 illustrates a schematic front view of an example of a function component in use according to some embodiments of the present disclosure.
Figure 6:
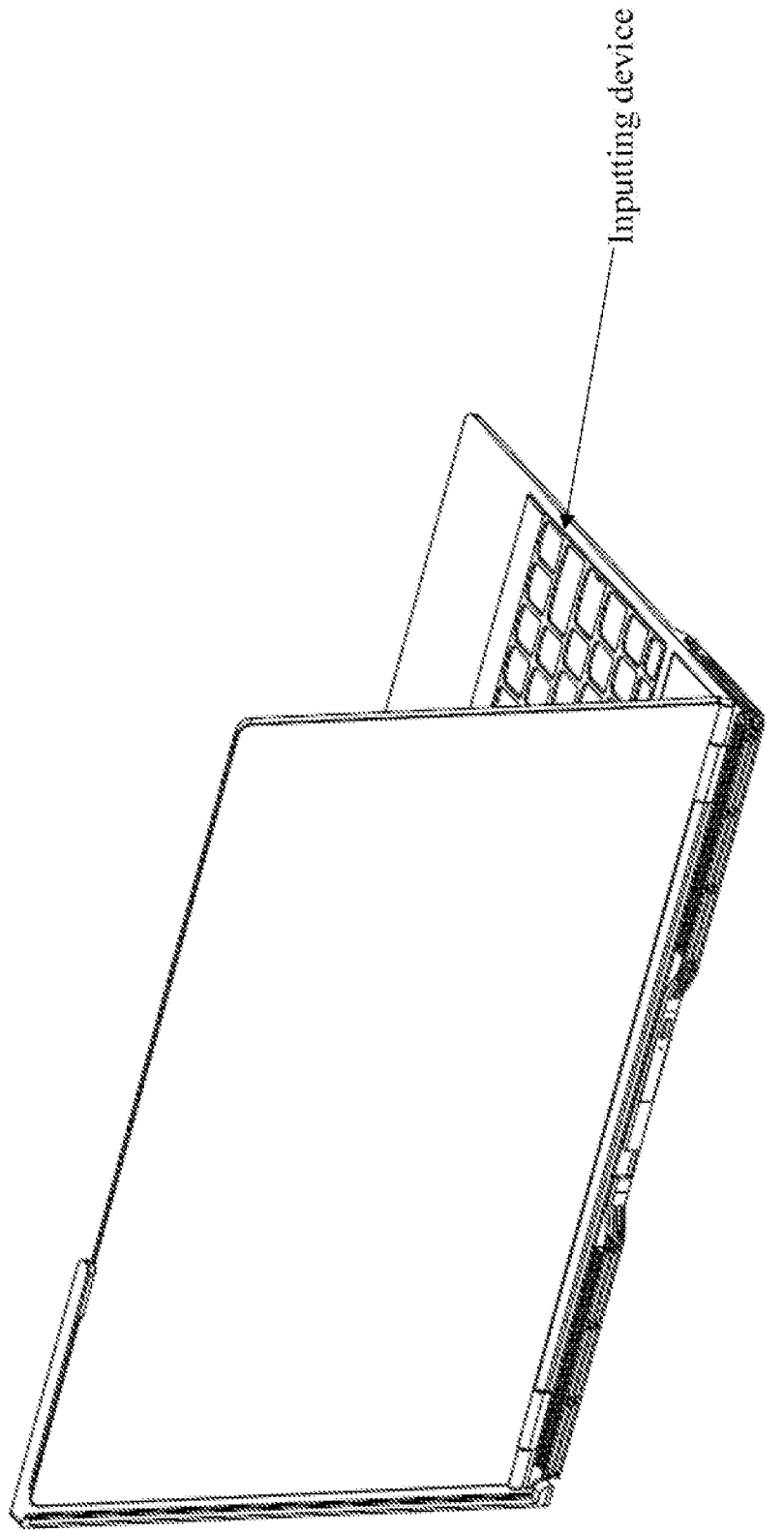
FIG. 6 illustrates a schematic rear view of an example of a function component in use according to some embodiments of the present disclosure.

As shown in FIGS. 5-6, a function module is coupled with the upper airflow deflector through a first rotating bracket 8 and second rotating bracket 7. The function module is configured on the second rotating bracket 7. One end of the first rotating bracket 8 is rotationally connected to the second rotating bracket 7 and the other end of the first rotating bracket 8 is rotationally connected to the upper airflow deflector. The rotation axis of the first rotating bracket 8 and the rotation axis of the second rotating bracket 7 are both perpendicular to the rotation axis of rotating the first body 1 relative to the second body 2. The length of the first rotating bracket 8 us greater than the height of the opened first body 1. When the function module is in use, the first rotating bracket 8 rotates from a horizontal direction (i.e., parallel to the plane of the second body 2) to a vertical direction (i.e., perpendicular to the plane of the second body 2), and the second rotating bracket 7 drives the function module to rotate relative to the first rotating bracket 8, such that the second rotating bracket 7 is moved in the horizontal direction to a position adjacent to the middle of the upper part of the first body 1. When the function module needs to be stowed, the second rotating bracket 7 drives the function module to rotate relative to the first rotating bracket 8, such that the second rotating bracket 7 is moved in the vertical direction to align the second rotating bracket 7 in a straight line with the first rotating bracket 8. Then, the first rotating bracket 8 drives the second rotating bracket 7 to rotate from the vertical direction to the horizontal direction together to get close to the upper airflow deflector, thereby improving the appearance.

For structural simplification, in some embodiments, the electronic device may only include the first rotating bracket 8. The function module can be disposed at the end of the first rotating bracket 8 further away from the upper airflow deflector and the first rotating bracket 8 rotates to the vertical direction, such that the first rotating bracket 8 is configured to place the function module on a side of the upper part of the first body 1. In some other embodiments, the length of the first rotating bracket 8 can be extended to maintain an angle when the first rotating bracket 8 is rotated to the vertical direction, such that the first rotating bracket 8 is configured to place the function module to a position adjacent to the middle of the upper part of the first body 1. Further, the function module may also be connected to the upper airflow deflector through a telescopic rod or telescopic bracket to achieve the effect that the function module is raised when in use and is lowered and concealed when not in use. The detail description is omitted.

After the first switching module 4 is moved to the second position, the distance between the function component 6 and the second body 2 may also be equal to the distance between the display module and the second body 2. That is, the function component 6 is disposed on the left-side or the right-side of the display module.

In some embodiments, the first opening 21 is a first airflow outlet. The second opening is disposed at the end of the second body 2 further away from the first body 1. The second opening faces toward a direction opposite to the direction the first opening 21 faces. The second opening includes an airflow inlet 24 on the first part and a second airflow outlet 23 on the second part. The first airflow outlet and the second airflow outlet 23 are both connected to the airflow inlet 24.

In some embodiments, the first opening faces upward and the second opening faces downward. One portion of the downward facing second opening functions as the airflow inlet 24 and the other portion of the downward facing second opening functions as the second airflow outlet 23. During the operation, the airflow enters the airflow inlet 24 at the bottom of the second body 2 and splits into two airflows. One of the two airflows blow upward through the first airflow outlet, and the other of the two airflows blows downward through the second airflow outlet 23. That is, the airflow volume is increased, and the heat dissipation efficiency is increased. Further, the first opening 21 can also be the airflow inlet 24, and the entire second opening can also be the airflow inlet 24 or the airflow outlet.

In some embodiments, the electronic device further includes a second switching module 5 having a third position and a fourth position. The second switching module 5 at the third position blocks the second airflow outlet 23. The second switching module 5 at the fourth position does not block the second airflow outlet 23, and the second switching module 5 makes the distance between the second part and a supporting surface greater than a distance between the first part and the supporting surface.

The second switching module 5 can be a lower airflow deflector. When not in use, the second airflow outlet 23 is concealed by the lower airflow deflector, thereby improving the appearance. When the second airflow outlet 23 is in use, the lower airflow deflector deflects the airflow exiting the second airflow outlet 23 away from the airflow inlet 24. That is, the hot air is blown in a rear-downward direction to avoid the airflow inlet 24. At the same time, the lower airflow deflector at the fourth position opens downward to raise the second part of the second body 2, such that the first part at the front side is lower than the second part at the rear side and the rear end of a keyboard is higher than the front end of the keyboard. Thus, the user experience of inputting is improved, the height of the second opening is raised to increase the volume of both the inlet airflow and the outlet airflow, and the heat dissipation efficiency is improved.

When the user operates the notebook computer in a gaming mode, the upper airflow deflector and the lower airflow deflector may open simultaneously to increase the volume of both the inlet airflow and the outlet airflow to improve the heat dissipation efficiency.

The second switching module 5 can also be a grille. In some embodiments, the electronic device may not include the second switching module 5 leaving the second opening unprotected.

To improve the heat dissipation efficiency, the second body 2 further includes a third opening 22 disposed on the second part and facing toward the rear side, the left side and the right side.

Figure 7:
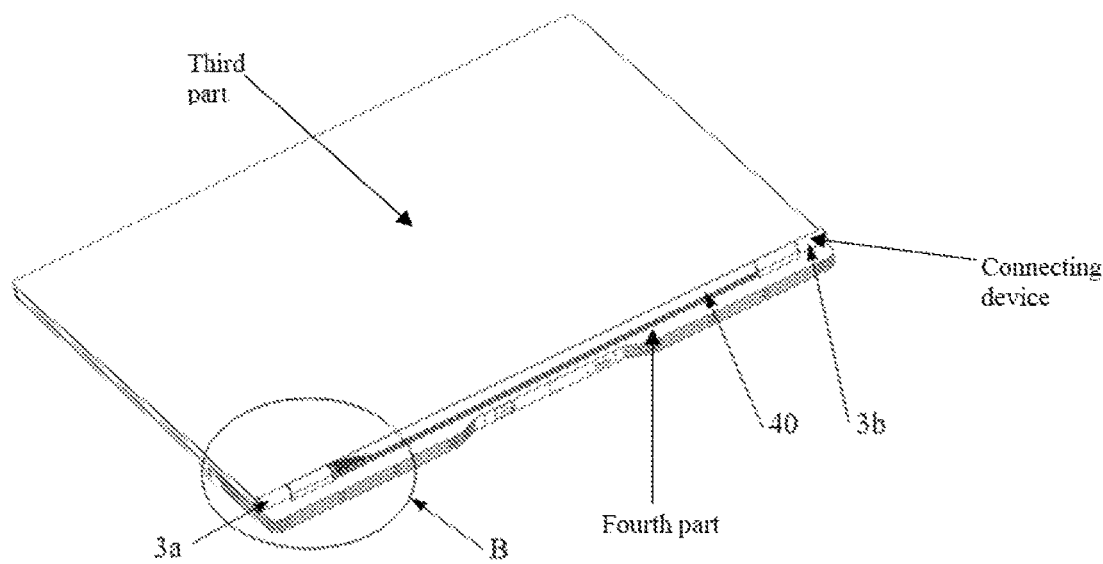
FIG. 7 illustrates a partial cross-sectional view of an example of an electronic device according to some embodiments of the present disclosure.
Figure 8:
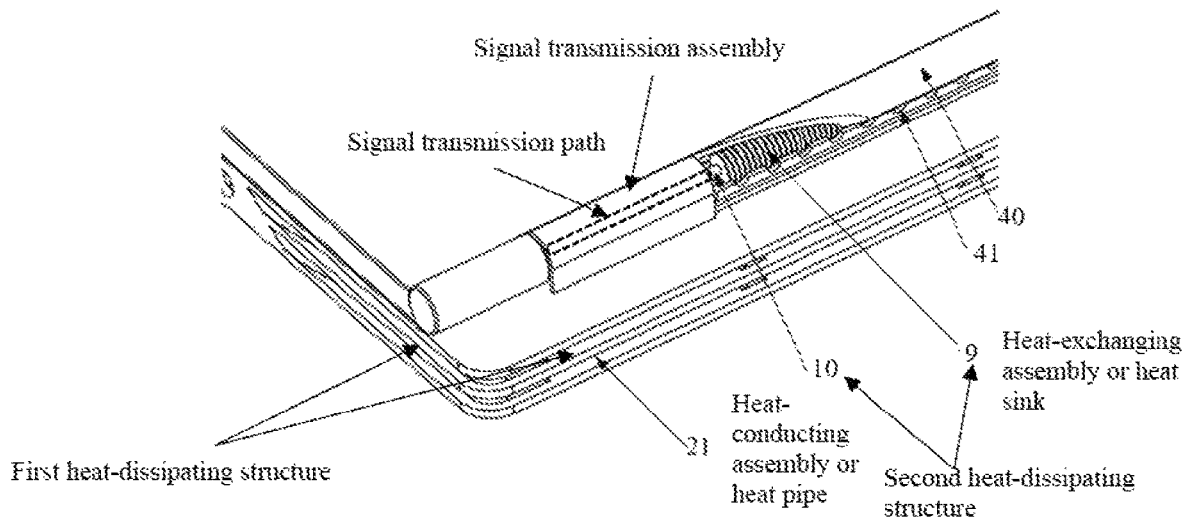
FIG. 8 illustrates a partially enlarged view of an area B in FIG. 7.

In some embodiments, referring to FIGS. 7-8, the electronic device includes a first body 1, a second body 2, and a connecting device. A first heat-dissipating structure is disposed on the second body 2 for dissipating heat outward. The connecting device rotationally connects between the first body 1 and the second body 2. The connecting device includes a second heat-dissipating structure for dissipating the heat of the second body 2.

In some embodiments, the second body 2 dissipates the heat through the first heat-dissipating structure and through the second heat-dissipating structure disposed in the connecting device. Dissipating the heat through both the first heat-dissipating structure and the second heat-dissipating structure improves the heat dissipation efficiency, suitable for the electronic device having a high system power consumption and high-end configurations.

The second heat-dissipating structure may include an independent heat dissipation path or may have a heat dissipation path intersecting with that of the first heat-dissipating structure. That is, the first heat-dissipating structure and the second heat-dissipating structure are configured to divide the heat dissipation path into two separate heat dissipation branches to achieve the objective of the heat dissipation.

The electronic device may include a notebook computer, a foldable smart phone, or other devices having two connected structures.

In some embodiments, the second body 2 includes an inputting surface. The connecting device is disposed on the inputting surface and divides the inputting surface into a third part and a fourth part. The third part includes an inputting device. The first heat-dissipating structure includes a first opening 21 for heat dissipation. The first opening 21 is disposed on a side of the second body 2 adjacent to the fourth part.

The inputting device includes an inputting component array for inputting characters. The inputting device can be a physical inputting component array such as a keyboard or a virtual inputting component array such as a touch plate or a touch screen displaying a keyboard.

When the electronic device is the notebook computer, the first body 1 is a display screen, the second body is a motherboard base, and the connecting device is a rotating shaft mechanism. The first heat-dissipating structure is disposed at the motherboard base. The second heat-dissipating structure is disposed at the rotating shaft mechanism.

The inputting surface refers to a top surface of the inputting device of the motherboard base. The rotating shaft mechanism is disposed on the top surface of the mother board base and divides the top surface into a third part and a fourth part arranged front to back. When the rotating shaft mechanism includes a left-side shaft and a right-side shaft, a line connecting the two rotating shafts and an extension of the line separate the third part and the fourth part. When the rotating shaft mechanism includes a long rotating shaft, the extension line of the long rotating shaft separates the third part and the fourth part.

The keyboard is disposed at the third part in the front. The first opening 21 of the second heat-dissipating structure is disposed on the rear side, the left side, and the right side of the fourth part in the back. As such, a blowing airflow of the first opening 21 does not face toward the display screen to avoid affecting the display screen. For design consideration of the heat dissipation path, the first opening 21 may be disposed only on one of the rear side, the left side, and the right side of the fourth part in the back.

For example, the first body 1 and the second body 2 are both plate-shaped. After the first body 1 closes on the second body 2, a front-to-back length of the first body 1 is shorter than a front-to-back length of the second body 2. A front end of the first body 1 is aligned with a front end of the second body 2. A rear end of the second body 2 protrudes from a rear end of the first body 1. In one example, the rear end of the second body 2 can be a flat surface, that is, the left-side width and the right-side width of the fourth part are approximately equal. In another example, the rear end of the second body 2 can be an uneven surface having a protrusion on at least one side or in the middle. The first opening 21 is disposed at the protrusion. Interface ports of the second body 2 are disposed in a recessed section of the rear end.

In some embodiments, the connecting device is disposed on a side of the overall thickness of the second body 2 without occupying or increasing the thickness dimension of the second body 2. Thus, the size of the first heat-dissipating structure disposed on the second body 2 is maximized to ensure the heat dissipation efficiency. The connecting device may also be disposed at other positions of the second body 2, for example, at the rear side of the second body 2 adjacent to the inputting surface.

The second heat dissipating structure includes a heat-conducting assembly for conducting the heat from the second body 2 outward. In some embodiments, the heat-conducting assembly is a through-hole connecting between the second body 2 and the connecting device for dissipating the hot air outward from the second body 2.

In some embodiments, a first end of the heat-conducting assembly is connected to the second body 2 or the first heat dissipating structure. The heat-conducting assembly can also be a heat pipe 10. A first end of the heat pipe 10 is connected to the second body 2 or the first heat-dissipating structure. The heat-conducting assembly can also be a heat-conducting plate. The heat pipe 10 can be a copper pipe having a superior heat-conducting characteristics for directly dissipating the heat from the second body 2 or indirectly dissipating the heat from the second body 2 through the first opening 21 to achieve the objective of heat dissipation.

In some embodiments, for more efficiently dissipating the heat, the second heat-dissipating structure further includes a heat-exchanging assembly coupled with a second end of the heat-conducting assembly to dissipate the heat into the ambient air of the electronic device. The heat-exchanging assembly can be a heat sink 9 connected to a second end of the heat pipe 10 or a heat-dissipating enclosure. The heat pipe 10 conducts the heat from the second body 2 outward and the heat sink 9 or the heat-dissipating enclosure further dissipates the heat into the ambient air of the electronic device. In some embodiments, the heat may be conducted outward from the second body 2 through the through-hole and the heat sink 9 or the heat-dissipating enclosure further dissipates the heat into the ambient air of the electronic device. In some other embodiments, the second heat-dissipating structure may not include the heat-exchanging assembly and only dissipates the heat into the ambient air of the electronic device through the heat-conducting assembly to achieve the objective of heat dissipation.

In some embodiments, the connecting device includes a signal transmission path. The signal transmission path can accommodate signal transmission assembly. The signal transmission assembly is configured to transmit signals between the first body 1 and the second body 2. The heat-conducting assembly may use at least a portion of the of the signal transmission path to conduct the heat of the second body 2 to the connecting device. In some embodiments, a portion of the signal transmission path of the connecting device is configured to form the heat-conducting assembly. The signal transmission path dissipates the heat outward from the second body 2 without a need for a dedicated through-hole connecting between the second body 2 and the connecting device, thereby simplifying the structure of the electronic device. In some other embodiments, a portion of the signal transmission path is configured for dissipating the heat outward from the second body 2 and at the same time, a dedicated through-hole is also used for dissipating the heat outward from the second body 2.

In some embodiments, the second heat-dissipating structure further includes a fourth opening (not shown in the drawings) for heat dissipation, disposed at the connecting device to connect to the ambient air of the electronic device. The heat-conducting assembly conducts the heat outward from the second body 2 and the heat sink 9 or the fourth opening further dissipates the heat outward to the ambient air of the electronic device to improve the heat dissipation efficiency.

For example, the fourth opening and the first opening 21 may face toward a same direction, both upward or both backward, to ensure a uniform outlet airflow for heat dissipation. In another example, the fourth opening and the first opening 21 may face toward different directions.

In the embodiments of the present disclosure, the second heat-dissipating structure also includes the heat-conducting assembly, the heat-exchanging assembly, and the fourth opening. As shown in FIG. 8, the heat-conducting assembly conducts the heat outward from the second body 2 to the heat-exchanging assembly and the heat-exchanging assembly further dissipates the heat through the fourth opening to the ambient air of the electronic device to improve the heat dissipation efficiency.

As shown in FIG. 7, the fourth opening includes a plurality of heat-dissipating holes 41 arranged along a rotating axis of the connecting device to ensure the heat dissipation efficiency and the structural strength. Alternatively, the second opening may also be arranged in a rectangular array direction or may be one single heat-dissipating hole.

In some embodiments, the connecting device includes a first rotating shaft 3a, a second rotating shaft 3b, and an enclosure 40. The second rotating shaft 3b is coaxially disposed with the first rotating shaft 3a and is separated by a gap between the first rotating shaft 3a and the second rotating shaft 3b. One end of the enclosure 40 is rotationally connected to the first rotating shaft 3a and another end of the enclosure 40 is rotationally connected to the second rotating shaft 3b. A receiving cavity is formed in the gap between the first rotating shaft 3a and the second rotating shaft 3b. The second heat-dissipating structure is disposed inside the receiving cavity and/or on the enclosure 40.

In some embodiments, the connecting device includes the first rotating shaft 3a and the second rotating shaft 3b. The receiving cavity is formed in the gap between the first rotating shaft 3a and the second rotating shaft 3b and is enclosed by the enclosure 40. The second heat-dissipating structure is disposed in an otherwise unused space between the first rotating shaft 3a and the second rotating shaft 3b to meet the demand for higher system power consumption and heat dissipation without occupying extra space, thereby making the structure more compact.

In some embodiments, the connecting device includes a rotating shaft. The rotating shaft includes a first solid segment, a second solid segment, and a hollow segment including a receiving cavity and connecting between the first solid segment and the second solid segment. The second heat-dissipating structure is disposed in the hollow segment. In the embodiments, the connecting device includes the rotating shaft. The rotating shaft includes a hollow segment in the middle. The second heat-dissipating structure is disposed in a receiving cavity of the hollow segment without occupying extra space, thereby making the structure more compact.

In some embodiments, a separate structure may be configured on one side of the rotating shaft to serve as the second heat-dissipating structure.

In some embodiments, the second heat-dissipating structure includes a plurality of heat sinks 9 disposed in the receiving cavity along a coaxial direction of the connecting device. For example, the heat pipe 10 and the plurality of heat sinks 9 of the second heat-dissipating structure is disposed in the receiving cavity. The second opening is disposed at the enclosure 40 or on the sidewall of the hollow segment. In the embodiments, the space inside the rotating shaft is used to accommodate the heat sink 9 without occupying extra space or increasing the thickness of the electronic device. The otherwise unused space is fully utilized to meet the demand for higher system heat dissipation. The plurality of heat sinks 9 may be evenly disposed along the rotating axis of the connecting device or may be unevenly disposed along the rotating axis of the connecting device. Alternatively, the plurality of heat sinks 9 may also be disposed on the sidewall outside the receiving cavity.

To further optimize the above technical solutions, the first heat-dissipating structure also includes a fifth opening (not shown in the drawings) disposed on the fourth part. In some embodiments, the fifth opening is disposed on the top surface of the motherboard base as an upward airflow outlet. The first opening 21 is disposed on the back side, the left side, and the right side of the motherboard base as a backward airflow outlet, a rightward airflow outlet, and a leftward airflow outlet. Thus, heat-dissipating openings are disposed on all sides of the fourth part except for the bottom side to maximize the heat dissipation efficiency. In some other embodiments, the fifth opening may be omitted.

In the specification, the structure of each part of the electronic device is described in a progressive manner. The structure of each part focusses on the differences from the existing structure. All or some of the electronic device can be obtained by combining one or more of the above-described structures.

The above description of the disclosed embodiments enables those skilled in the art to make or use the present disclosure. Various modifications to the embodiments will be apparent to those skilled in the art and the general principles defined herein may be implemented in other embodiments without departing from the spirit or scope of the present disclosure. Therefore, the present disclosure will not be limited to the embodiments shown herein, but should encompass the broadest scope consistent with the principles and novelties disclosed herein.

What is claimed is:

1. An electronic device comprising:
   a first body including a display module for displaying content;
   a second body coupled with the first body and including a first processor for generating the displayed content;
   a first switching module having a first position and a second position;
   wherein:
   the second body includes a first opening as a part of a first airflow path for dissipating heat generated by the first processor; and
   the first opening faces toward the first body;
   the first switching module blocks the first opening at the first position;
   the first switching module does not block the first opening at the second position;
   the first switching module includes a function component coupled with a second processor for obtaining data or outputting data;
   when the first body and the second body are at a first position, the display surface of the display module does not face toward the second body; and
   when the first switching module rotates to the second position, the function component obtains or outputs the data in a direction corresponding to the display surface of the display module.

2. The electronic device according to claim 1, wherein:
   the first body is adjacent to a projection of an end of the second body on the second body; and
   the second body is divided into a first part facing toward a display surface of the display module and a second part including the first opening.

3. The electronic device according to claim 2, wherein:
   the second body also includes a second opening as a part of a second airflow path for the dissipating the heat generated by the first processor; and
   the second opening and the first opening face different directions.

4. The electronic device according to claim 3, wherein:
   the first opening is a first airflow outlet;
   the second opening is disposed at the end of the second body away from the first body;
   the second opening faces toward a direction opposite a direction the first opening faces;
   the second opening includes an airflow inlet on the first part and a second airflow outlet on the second part; and
   the first airflow outlet and the second airflow outlet are both connected to the airflow inlet.

5. The electronic device according to claim 4, further comprising:
   a second switching module having a third position and a fourth position, wherein the second switching module blocks the second airflow outlet at the third position, the second switching module does not block the second airflow outlet at the fourth position, and the second switching module sets the distance between the second part and a supporting surface to be longer than a distance between the first part and the supporting surface.

6. The electronic device according to claim 1,
   wherein: the first switching module rotates between the first position and the second position; the first body and the second body are connected through a rotating shaft mechanism, the rotating shaft mechanism being connected to a driving mechanism; and when the first body rotates relative to the second body, the rotating shaft mechanism drives the first switching module to rotate through the driving mechanism.

7. The electronic device according to claim 1,
   wherein: the first switching module rotates between the first position and the second position; and the electronic device further includes: a driving assembly for driving the first switching module; a sensor for measuring a temperature corresponding to the second body; and a controller coupled to the sensor, after the temperature corresponding to the second body reaching a pre-set temperature, the controller controlling the driving assembly to drive the first switching module to rotate to the second position.

8. The electronic device according to claim 1, wherein:
   when the first switching module rotates to the second position, a distance between the function component and the second body is greater than a distance between the display module and the second body.

9. The electronic device according to claim 1, further comprising:
a connecting device configured to be a rotating shaft connecting the first body and the second body, the second body including a first heat-dissipating structure, and the connecting device including a second heat-dissipating structure for dissipating heat outward from the second body.

10. The electronic device according to claim 9, wherein:
the second body includes an inputting surface disposed on a top of the second body; and
the connecting device is partially disposed on the top of the second body and aligned along a straight line that divides the inputting surface into a third part and a fourth part, wherein:
the third part includes an inputting device; and
an area of the third part is greater than an area of the fourth part.

11. The electronic device according to claim 10, wherein:
the first heat-dissipating structure includes the first opening disposed on a side of the second body adjacent to the fourth part.

12. The electronic device according to claim 10, wherein:
the second heat-dissipating structure includes a heat-conducting assembly to conduct heat outward from the second body; and
a first end of the heat-conducting assembly is connected to the second body or the first heat-dissipating structure.

13. The electronic device according to claim 12, wherein:
the second heat-dissipating structure further includes a heat-exchanging assembly to dissipate heat outside the electronic device; and
a second end of the heat-conducting assembly is connected to the heat-exchanging assembly.

14. The electronic device according to claim 12, wherein:
the connecting device includes a signal transmission path;
the signal transmission path includes a signal transmission assembly for transmitting signals between the first body and the second body; and
the heat-conducting assembly uses a portion of the signal transmission path to conduct heat outward from the second body to the connecting device.

15. The electronic device according to claim 13, wherein:
the second heat-dissipating structure further includes a fourth opening disposed on the connecting device to connect to an outside of the electronic device; and
the fourth opening includes a plurality of heat-dissipating holes arranged along a rotating axis of the connecting device.

* * * * *